United States Patent [19]

Aloi

[11] Patent Number: 5,094,142
[45] Date of Patent: Mar. 10, 1992

[54] HANDLING SYSTEM FOR MERGING AMMUNITION ROUNDS FROM MULTIPLE AMMUNITION BAYS TO FEED A RAPID-FIRE GUN

[75] Inventor: Anthony J. Aloi, Richmond, Vt.

[73] Assignee: General Electric Company, Burlington, Vt.

[21] Appl. No.: 593,724

[22] Filed: Oct. 2, 1990

[51] Int. Cl.⁵ .............................................. F41A 9/04
[52] U.S. Cl. ..................................... 89/33.14; 89/34; 198/440; 198/449; 198/792
[58] Field of Search .................. 86/46; 89/33.1, 33.14, 89/33.16, 34; 198/792, 440, 449

[56] References Cited

U.S. PATENT DOCUMENTS

| | | | |
|---|---|---|---|
| 2,401,909 | 6/1946 | Carlzen | 89/33.2 |
| 2,488,679 | 11/1949 | Nobles | 193/25 AC |
| 2,740,180 | 4/1956 | Nobles | 24/613 |
| 2,756,638 | 7/1956 | Maillard | 89/33.5 |
| 2,875,671 | 3/1959 | Robinson | 89/33.2 |
| 3,076,386 | 2/1963 | Wey | 89/33.14 |
| 3,452,640 | 7/1969 | Maillard | 89/33.2 |
| 3,680,432 | 8/1972 | Rocha | 89/33.04 |
| 3,720,301 | 3/1973 | Garland et al. | 198/418.2 |
| 3,747,469 | 7/1973 | Ashley et al. | 89/34 |
| 4,311,081 | 1/1982 | Gillum | 89/33.04 |
| 4,401,008 | 8/1983 | Walker, Jr. | 89/33.14 |
| 4,424,735 | 1/1984 | Bacon et al. | 89/34 |
| 4,576,562 | 3/1986 | Anderson | 198/792 |
| 4,612,843 | 9/1986 | Marcon et al. | 89/33.04 |
| 4,765,223 | 8/1988 | Beckmann | 89/33.04 |
| 4,840,109 | 6/1989 | Muller et al. | 89/34 |

FOREIGN PATENT DOCUMENTS 763196 9/1980 U.S.S.R. ........................... 198/440

*Primary Examiner*—Stephen C. Bentley
*Attorney, Agent, or Firm*—Bailin L. Kuch; Robert A. Cahill

[57] ABSTRACT

An endless ammunition conveyor includes a set of laterally moveable carriers and a set of laterally fixed carriers arranged in alternating relation with the moveable carriers. Incident with conveyor movement, the moveable carriers are cammed between laterally offset positions relative to the fixed carriers for respective round exchanges with a pair of ammunition storage bays and interleaved, longitudinally aligned positions with the fixed carriers for round exchanges with a gun-feeding transfer unit. Concurrently, the pitch between adjacent fixed and moveable carriers is changed between a maximum pitch at the gun end of the conveyor and a minimum pitch at the bay end of the conveyor.

18 Claims, 3 Drawing Sheets

HANDLING SYSTEM FOR MERGING AMMUNITION ROUNDS FROM MULTIPLE AMMUNITION BAYS TO FEED A RAPID-FIRE GUN

The present invention relates to article handling systems and particularly to systems for feeding linkless rounds of ammunition to a rapid-fire gun.

BACKGROUND OF THE INVENTION

At the extraordinary firing rates of modern rapid-fire guns, extreme burdens are placed on ammunition handling systems serving the gun. They must abruptly accelerate the ammunition rounds from standstill to a high velocity to satisfy rates of fire of 6,000 to 12,000 shots per minute in short or sustained bursts. The power requirements to feed ammunition at such firing rates is substantial, particularly in the case of larger caliber ammunition. To reduce the power otherwise required to translate the entire round content of a storage magazine or bay at firing rate velocity, it is known to provide multiple bays from which ammunition rounds are removed in alternating fashion for serial feeding to the gun. For example, if two bays are utilized, and ammunition rounds are alternately transferred from the two bay conveyors to a serial ammunition conveyor, each bay conveyor needs to be driven at half the velocity of the ammunition conveyor. This approach, however, requires ammunition round merger mechanisms which heretofore have tended to be complex, costly, and a source of malfunctions.

In addition to power consumption, another major concern is space. In most ammunition handling system applications, space is a premium. This is particularly so in aircraft. To adequately support a rapid-fire gun, a large ammunition storage capacity is an absolute necessity. The magazines or bays are therefore bulky and difficult to accommodate in the limited available space. The system layout, i.e., arrangement of ammunition conveyor and bays, is thus extremely important. Then too, high packing density, i.e., small inter-round spacing or pitch, must be achieved to reduce the sizes of the system components to manageable proportions.

SUMMARY OF THE INVENTION

It is accordingly an object of the present invention to provide an improved ammunition handling system for rapid-fire guns.

A further object is to provide an ammunition handling system of the above-character, wherein ammunition rounds are feed alternately from multiple ammunition storage bays.

An additional object is to provide an ammunition handling system of the above-character, which provides for merging ammunition rounds delivered alternately from plural bays into a single stream for serial conveyance to a rapid-fire gun in an efficient and effective manner.

Another object is to provide an ammunition handling system of the above-character, wherein the packing density of the ammunition rounds received from the ammunition bays is significantly improved.

A still further object is to provide an ammunition handling system of the above-character, wherein the separation between ammunition rounds being conveyed to the rapid-fire gun is automatically varied from a short pitch for optimum packing density to a longer pitch acceptable to the gun.

Yet another object is to provide an ammunition handling system of the above-character, which accommodates a spaced-efficient component layout.

Other objects of the invention will in part be obvious and in part appear hereinafter.

In accordance with the present invention, there is provided an ammunition handling system for merging ammunition runs from a pair of ammunition bays into a single stream of rounds feeding a rapid-fire gun. Merging is achieved utilizing a common, endless conveyor serving the gun and the ammunition bays. To this end, the conveyor is equipped with a series of ammunition round carriers distributed throughout its length and arranged in two sets of alternating carriers; one carrier set accepting round handoffs from one bay and the other carrier set accepting round handoffs from the other bay while in laterally offset relation relative to the longitudinal direction of conveyor run. As the live ammunition rounds are conveyed away from the bays, the carriers of the two sets are converged into fully interleaved, longitudinally aligned relation for merged conveyance to a transfer unit where the rounds are transferred to a gun feeding conveyor. During return to the bays, the carriers of the two sets are diverged back to their laterally offset relation for accepting additional ammunition rounds from the bays. Typically, the empty carriers are loaded with spent shell casings from the gun for conveyance back to the bays where they are exchanced for live rounds.

To conserve space, the ammunition handling system of the invention also includes provisions for varying the inter-carrier spacing between a short pitch while the carriers of the two sets are in laterally offset relation at the ammunition bays and a long pitch while the carriers are at the gun conveyor transfer unit. Both pitch changing and merging/unmerging motions of the carriers are motivated by conveyor movement in a coordinated and simplified manner.

The invention accordingly comprises the features of construction, combination of elements and arrangement of parts, all as set forth below, and the scope of the invention will be indicated in the claims.

DESCRIPTION OF THE DRAWINGS

For a full understanding of the nature and objects of the invention, reference may be had to the following Detailed Description taken in conjunction with the accompanying drawings, in which.

Corresponding reference numerals refer to like parts throughout the several views of the drawings.

DETAILED DESCRIPTION

Figure 1:
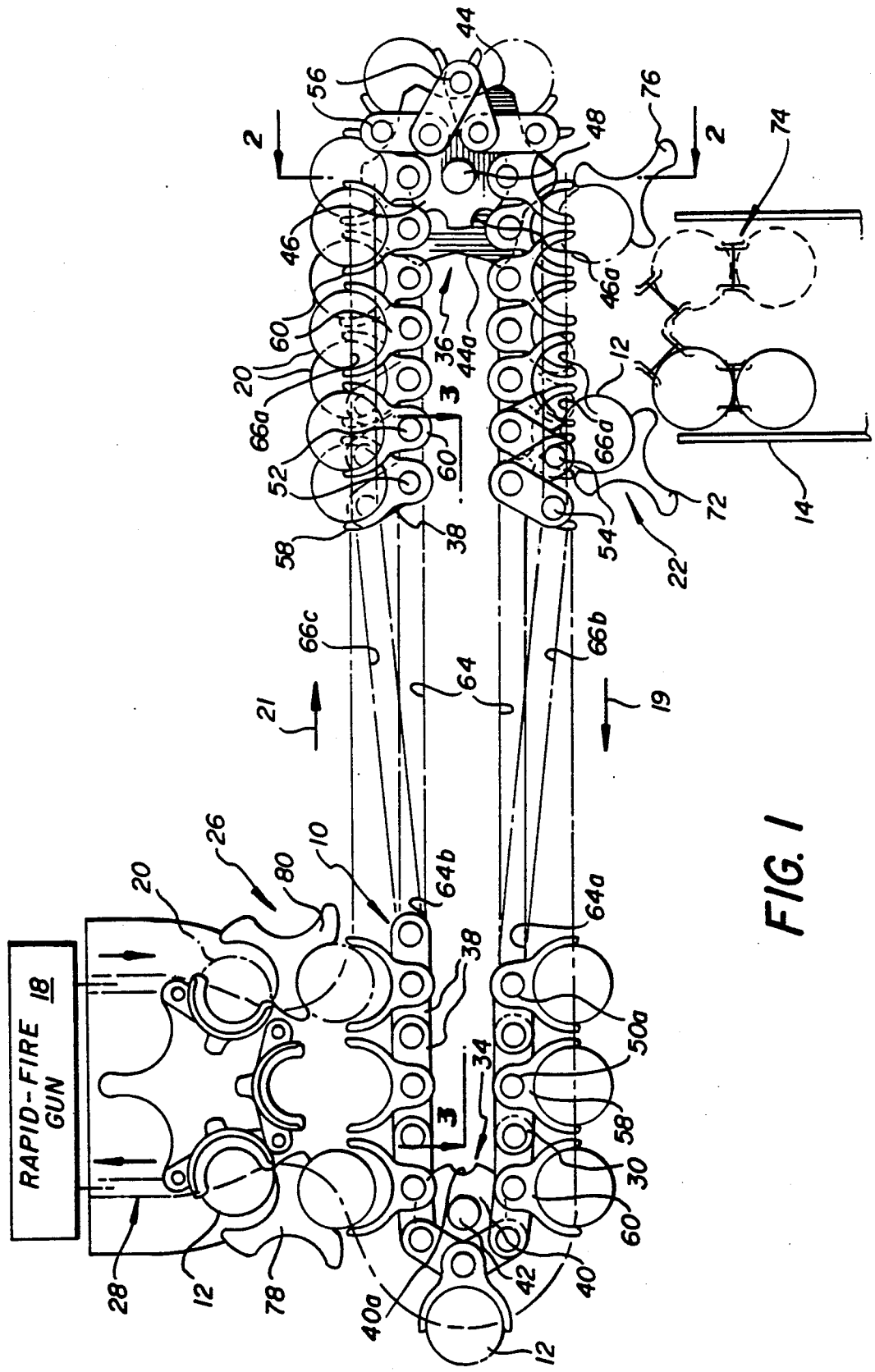
FIG. 1 is a side view of an ammunition handling system constructed in accordance with the present invention.
Figure 2:
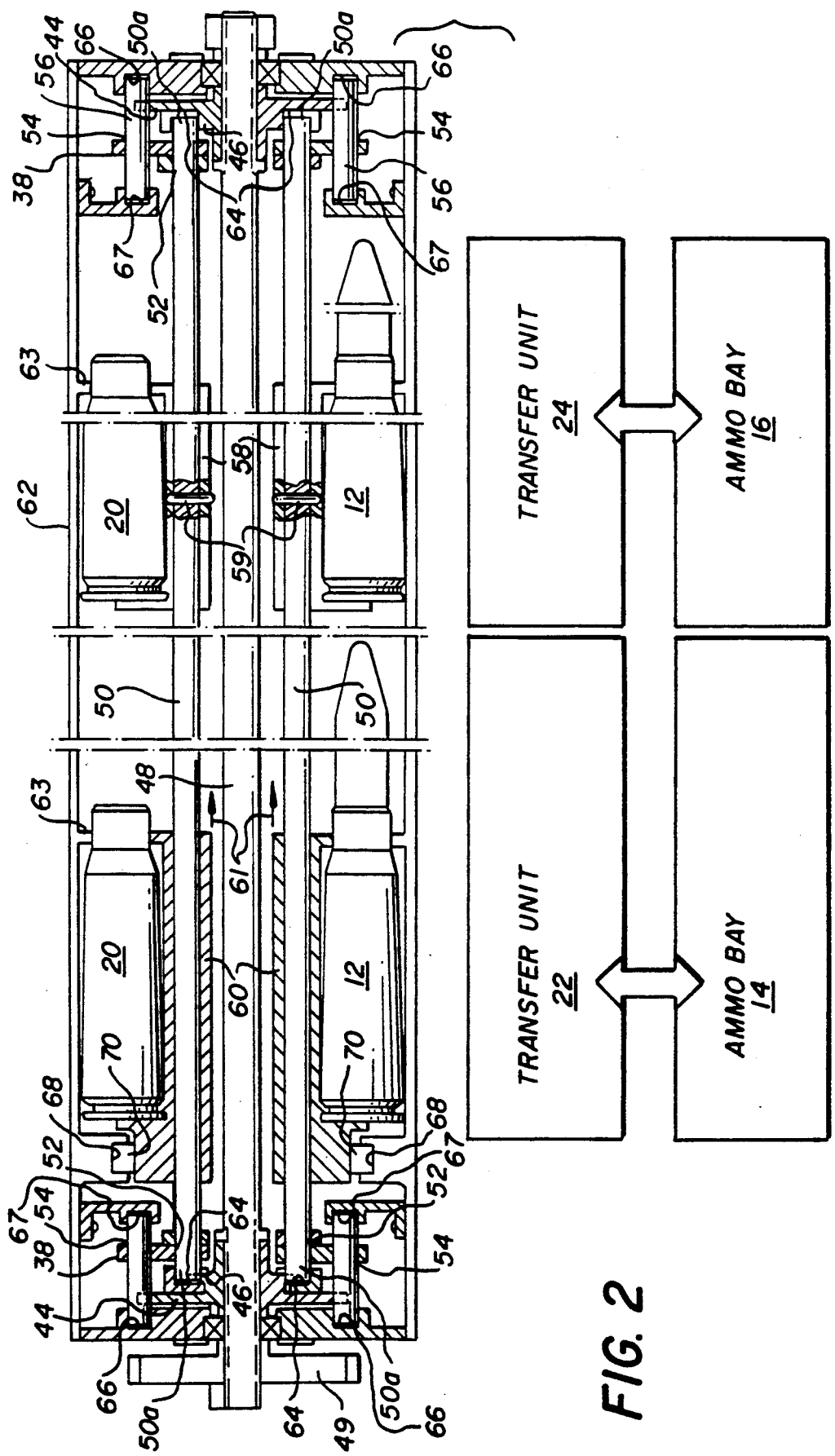
FIG. 2 is a sectional view taken along line 2—2 of FIG. 1.

The ammunition handling system of the present invention, as seen in FIGS. 1 and 2, includes an endless conveyor, generally indicated at 10, for conveying live ammunition rounds 12 in a lower run from a pair of ammunition bays 14 and 16 (FIG. 2) to a rapid fire gun 18 in the direction of arrow 19 and for conveying spent ammunition rounds (empty shell casings) 20 in an upper run from the gun back (arrow 21) to the bays. Identical transfer units, generally indicated at 22 and 24, handle the exchanges of spent rounds for live rounds between conveyor 10 and bays 14 and 16, respectively, while a transfer unit, generally indicated at 26, handles the live-spent round exchanges between conveyor 10 and a gun-feeding conveyor, generally indicated at 28.

Figure 3:
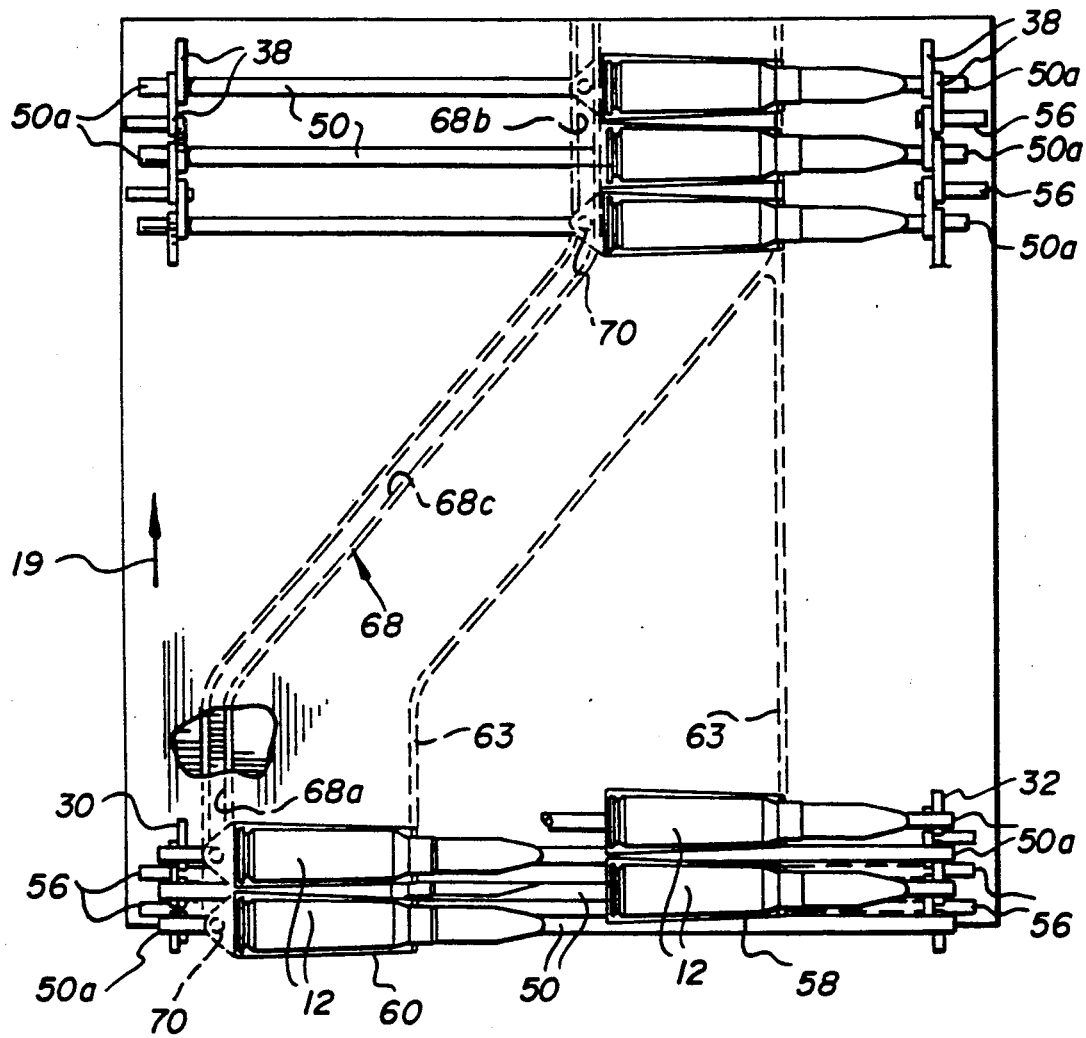
FIG. 3 is a sectional view taken along line 3—3 of FIG. 1.

Conveyor 10 is comprised of a pair of endless chains 30 and 32, the latter seen in FIG. 3, trained about a turnaround sprocket set, generally indicated at 34, positioned adjacent transfer unit 26 and a turnaround sprocket set, generally indicated at 36, positioned adjacent transfer units 22 and 24. Each chain consists of pivotally interconnected links 38 in conventional fashion. Sprocket set 34 comprises a pair of sprockets, one seen at 40, mounted by a shaft 42 in laterally spaced relation. Sprocket set 36, on the other hand, comprises a pair of dual sprockets 44 and 46 keyed on a shaft 48 in laterally spaced relation (FIG. 2) and generally longitudinally aligned with sprockets 40 of set 34. The conveyor is motivated by driving a gear 49 keyed on shaft 48. As seen in FIG. 1, sprocket set 34 supports the conveyor chains at a maximum pitch (links 38 fully straightened) preparatory to transiting transfer unit 26, while sprocket set 36 supports the conveyor chains at a minimum pitch (links substantially collapsed or folded on each other) preparatory to transit past transfer units 22 and 24.

As best seen in FIGS. 2 and 3, conveyor chains 30 and 32 are interconnected by a series rungs or rods 50 at uniformly distributed points along the chain length. In the illustrated embodiment, these rungs conveniently also serve as the pivotal interconnection between links 38 at pivot points indicated at 52. Alternating with these pivot points are pivot points 54 provided by link pivotally interconnecting pins 56 extending beyond the outboard sides of the chains. Rungs 50 have extensions 50a also projecting from the outboard sides of the chains, but to a lesser extend than pins 54.

Mounted by every other rung 50 is an ammunition round carrier 58, while intervening rungs serve to individually mount ammunition round carriers 60. Carriers 58 are fixed to their mounting rungs by suitable means, such as pins 59 (FIG. 2). However, carriers 60 are slidably mounted on their rungs, as indicated by arrows 61. As seen in FIGS. 2 and 3, carriers 58 and 60 are laterally offset relative to the longitudinal direction of conveyor run (arrows 19, 21, FIG. 1), such that carriers 58 move in round exchanging relation with transfer unit 24, and carriers 60 move in round exchanging relation with transfer unit 22. Except for access openings confronting transfer units 22, 24 and 26, ammunition conveyor 10 is enclosed by a housing 62 having internal guide ribs 63 serving to retain live rounds 12 and spent rounds 20 in their carriers 58 and 60 during conveyance.

To controllably vary conveyor pitch in terms of spacing between adjacent rungs 50, the opposed housing sidewalls are provided with upper and lower trackways 64 extending longitudinally in parallel relation at least between sprocket sets 34 and 36. The housing sidewalls are also provided with opposed upper and lower trackways 66, each having a section 66a located in outwardly offset, parallel relation to trackways 64 for a short distance leftward of sprocket set 36, as seen in FIG. 1, a converging (in terms of conveyor movement-arrow 19) trackway section 66b extending from lower section 66a into merger at point 64a with lower trackway 64, and a diverging (arrow 21) trackway section 66c extending from point 64b of unmerger with upper trackway 64 to upper trackway section 66a. As seen in FIGS. 1 and 2, rung extensions 50a move in upper and lower trackways 64, while the outer ends of pins 56 move in trackway sections 66a, 66b and 66c, as well as that portion of trackways 64 to the left of the vertically aligned merger 64a and unmerger 64b points. While the rung extensions and pins travel in the merged portions of trackways 64, chain links 38 are fully straightened to provide maximum pitch spacing between rungs sufficient to accommodate the fully interleaved carriers 58 and 60 in longitudinally aligned relation necessary for successfully round exchanges with transfer unit 26. The angular spacing of the notches 40a in sprockets 40, in which the rung extensions 50a and pins 56 are received, is such as to maintain this maximum pitch. To ensure adequate support for pins 56, their inner ends run in trackways 67 mounted to the top and bottom walls of housing 62 in opposed relation to the sections of trackways 66 and the merged portions of trayways 64.

While pins 56 travel through trackway sections 66a as rung extensions 50a move trackways 64, the chain links are maintained in a highly collapsed condition to establish minimum pitch in terms of separation between adjacent rungs 50. This minimum pitch is maintained by turn around sprocket set 36 as the pins are received in notches 44a in large diameter sprockets 44 and rung extensions are received in notches 46a of smaller diameter sprockets 46. Since carriers 58 and 60 are in non-interfering laterally offset relation as they pass transfer units 24 and 26, respectively, the spacings between consecutive carriers 58 and consecutive carriers 60 is comparable to that between the merged carriers passing transfer unit 28, such that successful round exchanges in each case are achieved. As the pins travel in the converging trackway sections 66b while the alternating rung extension travel in trackway 64, the chain links are progressively straightened to maximum pitch when the pins merge into trackway 64 at merger point 64a. Similarly, when pins 56 are diverted out of the trackway 64 into diverging trackway section 66c at unmerger point 64b and rung extensions 50a continue to run in trackway 64 as the upper run of conveyor 10 moves in the direction of arrow 21, conveyor links 38 are progressively collapsed to minimum pitch when the pins reach upper trackway section 66a.

To merge movable ammunition round carriers 60 with fixed ammunition round carriers 58, the housing top and bottom walls are provided with opposed cam tracks, generally indicated at 68; the lower one seen in plan view in FIG. 3. The movable carriers 60 are equipped with projecting cams 70 which run in these cam tracks which are seen to comprise straight longitudinal sections 68a at the ammunition bay end of the conveyor, straight longitudinal sections 68b at the gun end of the conveyor, and an interconnecting, converging cam track section 68c in the bottom wall cam track seen in FIG. 3. The top wall cam track has a corresponding diverging cam track section interconnecting the straight longitudinal cam track sections.

From the foregoing description, it is seen that as the lower conveyor run is driven in the direction of arrow 19 to convey live ammunition rounds away from transfer units 22, 24, cams 70 move into converging cam track sections 68c to begin propelling the laterally offset moveable carriers 60 rightward, as seen in FIG. 3, into merging relation with fixed carriers 58. At the same time, pins 56 move into converging trackway sections 66b to begin straightening conveyor links 38 from their collapsed, minimum pitch condition. As a result the spacings between fixed carriers 58 begin to increase, making room for the movable carriers to move into interleaved relation therewith. When the moveable carriers reach cam track section 68b, the conveyor links are fully straightened to maximum pitch, thereby creating sufficient space between the fixed carriers to accept the merger of the moveable carriers into fully interleaved, longitudinally aligned relation. This action occurs in the reverse in the upper half of the conveyor as spent rounds are conveyed away from transfer unit 26 in the direction of arrow 21. The movable carrier cams 70 move into the diverging cam track section as pins 56 transfer from trackway 64 into diverging trackway section 66c at unmerger point 64b. The chain links begin collapsing as moveable carriers 60 are drawn out of interleaved relation with fixed carriers 58, ultimately achieving their full, laterally offset relation when cams 70 arrive at cam track sections 68a as the chain links collapse to minimum pitch. To control the lateral positions of the moveable carriers in the regions of the turnaround sprocket sets, the terminations of the upper and lower straight, longitudinal cam track sections are preferably interconnected by arcuate cam track sections formed in the housing endwalls (not shown). Additionally or alternatively, housing guide ribs 51 are continued onto the housing endwalls for moveable carrier position control.

Transfer units 22 and 24 are identically constructed to include a handoff sprocket set 72 for successively transferring live ammunition rounds 12 from ammunition bay conveyors, generally indicated at 74, to the fixed and moveable carriers of conveyor 10 and a handoff sprocket set 76 for successively transferring spent ammunition rounds from the fixed and moveable carrier to the ammunition bay conveyors of bays 14 and 16. Transfer unit 26 includes a sprocket set 78 for handing off live rounds from the fixed and moveable carriers to gun conveyor 28 and a sprocket set 80 for handing off spent rounds from the gun conveyor to the fixed and moveable carriers.

From the foregoing description, it is seen that the present invention provides eminently simple and highly reliable operating structure for merging ammunition retrieved alternately from a pair of ammunition storage bays into a serial stream of ammunition rounds for feeding a rapid-fire gun. As pointed out above, by merging rounds from a pair of ammunition bays, the bay conveyors need only run at one-half the firing rate velocity, thus conserving power. It will be appreciated that transfer units 22 and 24 could be continued into a single unit for handling live/spend round exchanges between bays 14 and 16 and the conveyor fixed and movable carriers. Moreover, the system layout takes up less space, since the storage bays can be stationed in lateral, side-by-side relation generally between the pair of ammunition conveyor chains. Space in the longitudinal direction is conserved, as is the length of the ammunition conveyor. Also significantly contributing to this space saving feature is the ability afforded by the present invention to significantly reduce the pitch between ammunition round carriers at the ammunition bay end of the conveyor and then increase this pitch to an inter-carrier spacing conducive to reliable rounds exchange with a gun-feeding conveyor.

While the merger of rounds from two ammunition bays has been disclosed, it will be appreciated that the teachings of the present invention can be applied to merging rounds from three ammunition bays. That is, the conveyor could be equipped with movable carriers laterally offset to each side of the fixed carriers at the bay end of the conveyor and converged into logitudinally aligned, merged relation with the center, fixed carriers during conveyance to the gun.

The present invention has been disclosed in its application to handling rounds of ammunition, however, it will occur to those skilled in the art that the principles thereof can be applied to handling a wide variety of articles.

It is seen that the objects set forth above, including those made apparent from the preceding Detailed Description, are efficiently attained, and, since certain changes may be made in the construction set forth above without departing from the scope of the present invention, it is intended that matters of detail be taken as illustrative and not in a limiting sense.

Having described the invention, what is claimed as new and desired to secure by Letters Patent is:

1. An ammunition handling system for feeding live rounds of ammunition alternately from first and second ammunition storage bays to a rapid-fire gun, said system comprising, in combination:
   A. an endless ammunition conveyor;
   B. a first transfer unit for transferring live ammunition rounds from said first bay to said conveyor;
   C. a second transfer unit for transferring live ammunition rounds from said second bay to said conveyor; and
   D. a third transfer unit for transferring live ammunition rounds from said conveyor to the rapid-fire gun;
   E. wherein said ammunition conveyor includes:
   1) a pair of endless chains, each consisting of pivotally interconnected links,
   2) first and second longitudinally spaced turnaround sprocket sets about which said chains are trained in parallel, laterally spaced relation,
   3) alternating first and second rungs interconnecting said chains at regularly spaced intervals,
   4) a plurality of first ammunition round carriers individually mounted by said first rungs for successively accepting live ammunition rounds from said first transferring means for conveyance to said third transferring means,
   5) a plurality of second ammunition round carriers individual mounted by said second rungs for successively accepting live ammunition rounds from said second transfer unit for conveyance to said third transfer unit,
   6) merging means operative upon driven rotation of said first and second sprocket sets to successively converge said first and second ammunition round carriers from laterally offset relative positions to interleaved, longitudinally aligned relative positions during conveyance away from said first and second transfer units toward said third transfer unit and to successively diverge said first and second ammunition round carriers from said longitudinally aligned relative positions to said laterally offset relative positions during conveyance away from said third transfer unit toward said first and second transfer units, and
   7) pitch changing means operative upon driven rotation of said first and second sprocket sets to establish a first pitch between adjacent said first and second rungs during conveyor movement past said first and second transfer units and to establish a second pitch between adjacent said first and second rungs during conveyor movement past said third transfer unit, said first pitch being of a lesser dimension than said second pitch.

2. The ammunition handling system defined in claim 1, wherein said first and second ammunition bays are stationed in side-by-side relation generally between said chains.

3. The ammunition handling system defined in claim 1, wherein said first ammunition round carriers are fixed on said first rungs and said second ammunition round carriers are slideably mounted on said second rungs for movement by said merging means between said laterally offset and interleaved, longitudinally aligned positions with said first ammunition round carriers.

4. The ammunition handling system defined in claim 3, wherein said merging means includes a cam track extending between said first and second turnaround sprocket sets and a separate cam carried by each of said second ammunition round carriers and riding in said cam track to propel said second ammunition round carriers between said laterally offset and interleaved, longitudinally aligned positions with said first ammunition round carriers.

5. The ammunition handling system defined in claim 1, wherein said links of said chains are interconnected at alternating first and second pivotal connections, said first and second rungs interconnecting said chains at alternating said first pivotal connections, said pitch changing means including first pins respectively laterally extending from said first pivotal connections, second pins respectively laterally extending from said second pivotal connections, and first and second trackways extending between said first and second turnaround sprocket sets and in which said first and second pins respectively travel, said first and second trackways in longitudinally aligned relation for conveyor movement past said third transfer unit to establish said second pitch by forcing said chain links to assume a straightened condition and in longitudinally offset relation for conveyor movement past said first and second transfer units to establish said first pitch by forcing said chain links to assume a partially collapsed condition.

6. The ammunition handling system defined in claim 5, wherein one of said first and second trackways includes a converging trackway section to progressively change the pitch from said first pitch to said second pitch during conveyor movement from said first and second transfer units to said third transfer unit and a diverging trackway section to progressively change the pitch from said second pitch to said first pitch during conveyor movement from said third transfer unit to said first and second transfer units.

7. The ammunition handling system defined in claim 6, wherein said second turnaround sprocket set is positioned adjacent said third transfer unit and engages said chains while in said second pitch.

8. The ammunition handling system defined in claim 7, wherein said first sprocket set is positioned adjacent said first and second transfer units and engages said chains while in said first pitch.

9. The ammunition handling system defined in claim 8, wherein said first sprocket set includes a pair of laterally spaced first sprockets for engaging said first pins and a pair of laterally spaced second sprockets for engaging said second pins.

10. The ammunition handling system defined in claim 1, wherein said first and second ammunition round carriers convey spent ammunition rounds accepted from said third transfer unit to said first and second transfer units for transfer into said first and second storage bays.

11. An ammunition handling system for feeding live rounds of ammunition alternately from first and second ammunition storage bays to a rapid-fire gun, said system comprising, in combination:

A. an endless ammunition conveyor;
B. first means for transferring live ammunition rounds from said first bay to said conveyor;
C. second means for transferring live ammunition rounds from said second bay to said conveyor;
D. third means for transferring live ammunition rounds from said conveyor to the rapid-fire gun;
E. wherein said ammunition conveyor includes:
  1) a pair of endless chains, each consisting of a series of links interconnected at alternating first and second pivotal connections,
  2) first and second longitudinally spaced turnaround sprocket sets about which said chains are trained in parallel, laterally spaced relation,
  3) alternating first and second rungs interconnecting said chains at said first pivotal connections,
  4) a plurality of first ammunition round carriers individually mounted by said first rungs for successively accepting live ammunition rounds from said first transferring means for conveyance to said third transferring means,
  5) a plurality of second ammunition round carriers individual mounted by said second rungs for successively accepting live ammunition rounds from said second transferring means for conveyance to said third transferring means, and
  6) pitch changing means operative upon driven rotation of said first and second sprocket sets to establish a first pitch between adjacent said first and second rungs during conveyor movement past said first and second transferring means and to establish a second pitch between adjacent said first and second rungs during conveyor movement past said third transferring means, said first pitch being of a lesser dimension than said second pitch, said pitch changing means including first pins respectively laterally extending from said first pivotal connections, second pins respectively laterally extending from said second pivotal connections, and first and second trackways extending between said first and second turnaround sprocket sets and in which said first and second pins respectively travel, said first and second trackways in longitudinally aligned relation for conveyor movement past said third transferring means to establish said second pitch by forcing said chain links to assume a straightened condition and in longitudinally offset relation for conveyor movement past said first and second transferring means to establish said first pitch by forcing said chain links to assume a partially collapsed condition.

12. The ammunition handling system defined in claim 11, wherein one of said first and second trackways includes a converging trackway section to progressively change the pitch from said pitch to said second pitch during conveyor movement from said first and second transferring means to said third transferring means and a diverging trackway section to progressively change the pitch from said second pitch to said first pitch during conveyor movement from said third transferring means to said first and second transferring means.

13. The ammunition handling system defined in claim 12, wherein said ammunition conveyor further includes merging means operative upon driven rotation of said first and second sprocket sets to successively converge said first and second ammunition round carriers from laterally offset relative positions to interleaved, longitudinally aligned relative positions during conveyance away from said first and second transferring means toward said third transferring means and to successively diverge said first and second ammunition round carriers from said longitudinally aligned relative positions to said laterally offset relative positions during conveyance away from said third transferring means toward said first and second transferring means.

14. The ammunition handling system defined in claim 13, wherein said first ammunition round carriers are fixed on said first rungs and said second ammunition round carriers are slideably mounted on said second rungs for movement by said merging means between said laterally offset and interleaved, longitudinally aligned positions with said first ammunition round carriers.

15. The ammunition handling system defined in claim 14, wherein said merging means includes a cam track extending between said first and second turnaround sprocket sets and a separate cam carried by each of said second ammunition round carriers and riding in said cam track to propel said second ammunition round carriers between said laterally offset and interleaved, longitudinally aligned positions with said first ammunition round carriers.

16. An article handling system for feeding articles alternately from first and second storage units to a utilization device, said system comprising, in combination:
   A. an endless conveyor;
   B. a first transfer unit for transferring articles from said first storage unit to said conveyor;
   C. a second transfer unit for transferring articles from said second storage unit to said conveyor; and
   D. a third transfer unit for transferring articles from said conveyor to the utilization device;
   E. wherein said conveyor includes:
      1) a pair of endless chains, each consisting of pivotally interconnected links,
      2) first and second longitudinally spaced turnaround sprocket sets about which said chains are trained in parallel, laterally spaced relation,
      3) alternating first and second rungs interconnecting said chains at regularly spaced intervals,
      4) a plurality of first article carriers individually mounted by said first rungs for successively accepting articles from said first transfer unit for conveyance to said third transfer unit,
      5) a plurality of second article carriers individual mounted by said second rungs for successively accepting articles from said second transfer unit for conveyance to said third transfer unit,
      6) merging means operative upon driven rotation of said first and second sprocket sets to successively converge said first and second article carriers from laterally offset relative positions to interleaved, longitudinally aligned relative positions during conveyance away from said first and second transfer units toward said third transfer unit and to successively diverge said first and second article carriers from said longitudinally aligned relative positions to said laterally offset relative positions during conveyance away from said third transfer unit toward said first and second transfer units, and
      7) pitch changing means operative upon driven rotation of said first and second sprocket sets to establish a first pitch between adjacent said first and second rungs during conveyor movement past said first and second transfer units and to establish a second pitch between adjacent said first and second rungs during conveyor movement past said third transfer unit, said first pitch being of a lesser dimension than said second pitch.

17. The article handling system defined in claim 16, wherein said first article carriers are fixed on said first rungs and said second article carriers are slideably mounted on said second rungs for movement by said merging means between said laterally offset and interleaved, longitudinally aligned positions with said first article carriers, said merging means including a cam track extending between said first and second turnaround sprocket sets and a separate cam carried by each of said second article carriers and riding in said cam track to propel said second article carriers between said laterally offset and interleaved, longitudinally aligned positions with said first article carriers.

18. The article handling system defined in claim 17, wherein said links of said chains are interconnected at alternating first and second pivotal connections, said first and second rungs interconnecting said chains at alternating said first pivotal connections, said pitch changing means including first pins respectively laterally extending from said first pivotal connections, second pins respectively laterally extending from said second pivotal connections, and first and second trackways extending between said first and second turnaround sprocket sets and in which said first and second pins respectively travel, said first and second trackways in longitudinally aligned relation for conveyor movement past said third transfer unit to establish said second pitch by forcing said chain links to assume a straightened condition and in longitudinally offset relation for conveyor movement past said first and second transfer units to establish said first pitch by forcing said chain links to assume a partially collapsed condition.

* * * * *